(12) United States Patent
Toone et al.

(10) Patent No.: US 8,966,816 B2
(45) Date of Patent: Mar. 3, 2015

(54) AQUAPONICS SYSTEM

(75) Inventors: William Toone, Escondid, CA (US); Michael Ready, San Diego, CA (US)

(73) Assignee: Ecolife Conservation, Escondido, CA (US)

( * ) Notice: Subject to any disclaimer, the term of this patent is extended or adjusted under 35 U.S.C. 154(b) by 96 days.

(21) Appl. No.: 13/559,590

(22) Filed: Jul. 26, 2012

(65) Prior Publication Data

US 2013/0047508 A1 Feb. 28, 2013

Related U.S. Application Data

(60) Provisional application No. 61/511,860, filed on Jul. 26, 2011.

(51) Int. Cl.
*A01G 31/00* (2006.01)
*A01K 63/00* (2006.01)
*A01G 31/02* (2006.01)

(52) U.S. Cl.
CPC ...................................... *A01G 31/02* (2013.01)
USPC .......................................... 47/62 R; 119/246

(58) Field of Classification Search
CPC ............ A01K 63/00; A01G 9/00; A01G 9/20
USPC .............................. 47/62 R, 69; 119/245, 246
See application file for complete search history.

(56) References Cited

U.S. PATENT DOCUMENTS

| 5,775,260 | A | * | 7/1998 | Jansen | 119/246 |
| 5,820,759 | A | | 10/1998 | Stewart et al. | |
| 6,827,036 | B2 | | 12/2004 | Connolly | |
| 2002/0108582 | A1 | | 8/2002 | Connolly | |
| 2003/0150394 | A1 | * | 8/2003 | Wolfe | 119/246 |
| 2006/0150496 | A1 | * | 7/2006 | Blaakmeer et al. | 47/62 R |
| 2009/0301399 | A1 | | 12/2009 | Brown et al. | |
| 2010/0031893 | A1 | | 2/2010 | Bodlovich et al. | |
| 2011/0120005 | A1 | | 5/2011 | King | |
| 2011/0296757 | A1 | | 12/2011 | McGrath | |
| 2012/0029709 | A1 | | 2/2012 | Safreno | |
| 2013/0008386 | A1 | | 1/2013 | Jacobs | |

OTHER PUBLICATIONS

Eco-Cycle Aquaponics Instruction Manual, Jan. 2013, published on-line at www.ecolifeconservation.org.

* cited by examiner

*Primary Examiner* — Monica Williams

(74) *Attorney, Agent, or Firm* — Eleanor M. Musick; Greer, Burns & Crain, Ltd.

(57) ABSTRACT

The modular aquaponics assembly includes a frame, at least one tray adapted for retaining water and supporting at least one container for retaining a growing medium therein for support plants. A light fixture is disposed within the frame above the at least one tray, and an aquarium for supporting aquatic fauna is positioned near the bottom of the frame. A water circulating system is provided for circulating water from the aquarium through the at least one tray and back to the aquarium. In one embodiment, the frame is adapted to removably sit on top of the aquarium. In another embodiment, an outer skin encloses the frame, aquarium and other components to create an aesthetically pleasing structure that is both decorative and functional.

13 Claims, 6 Drawing Sheets

AQUAPONICS SYSTEM

RELATED APPLICATIONS

This application claims the benefit of the priority of U.S. provisional application No. 61/511,860, filed Jul. 26, 2011, the disclosure of which is incorporated herein in its entirety.

FIELD OF THE INVENTION

The present invention relates to systems and method for providing a self contained system that may be used to combine plant and fish growth.

BACKGROUND OF THE INVENTION

In developing countries and poorer areas of some more developed countries, it is not uncommon for local wildlife to be illegally hunted as sources of food. For example, in some areas of Africa, bushmeat is the main source of protein for many of the isolated and disadvantaged inhabitants, leading to unregulated killing of wild populations of animals, in some cases leading to local extinction of endangered primates including mountain gorillas, chimpanzees, bonobos, and monkeys, as well as elephants, large and small cats, and many types of antelopes.

Fish is generally considered to be a healthy, high quality source of protein, however, in recent years warnings have been issued about the potentials for poisoning due to accumulation of heavy metals and other toxins in wild-caught and, in some cases, farmed fish, where the farming occurs in natural bodies of water, with the fish confined within large cages. Large scale fish farming is increasingly being viewed as inhumane and environmentally unfriendly with an increased potential for spreading diseases among the crowded farmed fish that could infect wild populations. Where the fish are farmed in isolated ponds or tanks, treatment of nutrient-rich water can be costly. Mishandling of this water can result in contamination of nearby natural bodies and spread of disease among wild populations.

With the increased focus on the use of local food sources to reduce reliance on long distance transportation and to provide accessible sources of fresh foods, it is an attractive alternative to have the ability to raise fish in a small community or backyard aquaculture system.

Hydroponic gardening is well known for providing high quality fruits and vegetables, but such systems tend to be relatively expensive and generally not suitable for small community or backyard installation. The maintenance of such systems can require skilled labor, costly fertilizers and growing media. As a result, hydroponics systems are typically found only in more affluent communities where significant resources are available. As a result, the benefits of hydroponic techniques are not available to disadvantaged populations that have the greatest need for quality food sources.

Aquaponics is the combination of aquaculture (fish farming) and hydroponics (soil-less plant culture). In aquaponics, the nutrient-rich water that results from raising fish provides a source of natural fertilizer for the growing plants. As the plants consume the nutrients, they help to purify the water that the fish live in. A natural microbial process keeps both the fish and plants healthy. This creates a sustainable ecosystem where both plants and fish can thrive. Aquaponics can be the answer to a fish farmer's problem of disposing of nutrient rich water and a hydroponic grower's need for nutrient rich water. In aquaponics, the fish waste provides a food source for the growing plants and the plants provide a natural filter for the fish. This creates a mini ecosystem where both plants and fish can thrive.

Although the practices of fish farming and soil-less plant culture have been traced to ancient times, the combination of the two is relatively new. Research in aquaponics began in the 1970's and continues today.

Aquaponics systems that are currently commercially available tend to be bulky, with a fairly large footprint that consumes significant laboratory, greenhouse or warehouse space, or at least requires a large back yard for home system. Such systems are industrial in appearance and operation and would be neither practical nor appealing for installation within a customer-service business, such as a restaurant or market, in a home, or in a small yard. They are also not appropriate for use in classrooms, where aquaponics systems can provide hands-on demonstrations for teaching children everything from basic agriculture principles, e.g., seed-to-table, to biological phenomena such as the nitrogen cycle.

The need exists for a simple, sustainable means for providing high quality protein and other food sources that can be set-up and maintained in homes, businesses or classrooms in a relatively small area. The present invention is directed to this need.

SUMMARY OF THE INVENTION

In an exemplary embodiment, the present invention provides a small scale, self-contained modular system that may be used to simultaneously grow plants and fish or other aquatic animals in an indoor, non-industrial setting. In one embodiment, one or both the plants and fish may serve as sustainable food sources. In another embodiment, the system may be decorative, including a combination of edible or ornamental fish and edible or decorative plants.

In one aspect of the invention, the modular aquaponics systems comprises a frame for supporting a light source and one or more trays above one or more aquariums or other water-tight structures adapted for sustaining aquatic animals. Water-conducting tubing provides connection for flowing water from the aquarium to the tray. Return of water from the tray to the aquarium is provided by a drainage tube or by a drain in the tray that is positioned over the open top of the aquarium.

In one embodiment, the frame provides support for an outer cover or housing that encloses the light source, one or more trays, one or more aquariums and tubing to create an aesthetically-pleasing structure. Windows or cut-outs in the outer cover are positioned and dimensioned to allow plants and aquatic animals to be clearly seen while the structural components of the system are concealed.

In another embodiment, the frame is dimensioned to sit stably but removably on top of an aquarium to allow a conventional aquarium to be retrofitted to support a small aquaponics system. The tray may optionally be integrally formed with the frame.

In an aspect of the invention, the modular aquaponics assembly comprises a frame; at least one tray adapted for retaining water supported by the frame, the tray further adapted for supporting at least one container for retaining a growing medium therein for support plants; a light fixture disposed within the frame above the at least one tray; an aquarium for supporting aquatic fauna; and a water circulating system for circulating water from the aquarium through the at least one tray and back to the aquarium. In one embodiment, the frame is adapted to removably sit on top of the aquarium. In another embodiment, an outer skin encloses the frame and other components to create an aesthetically pleasing structure that is both decorative and functional.

DETAILED DESCRIPTION

Figure 1:
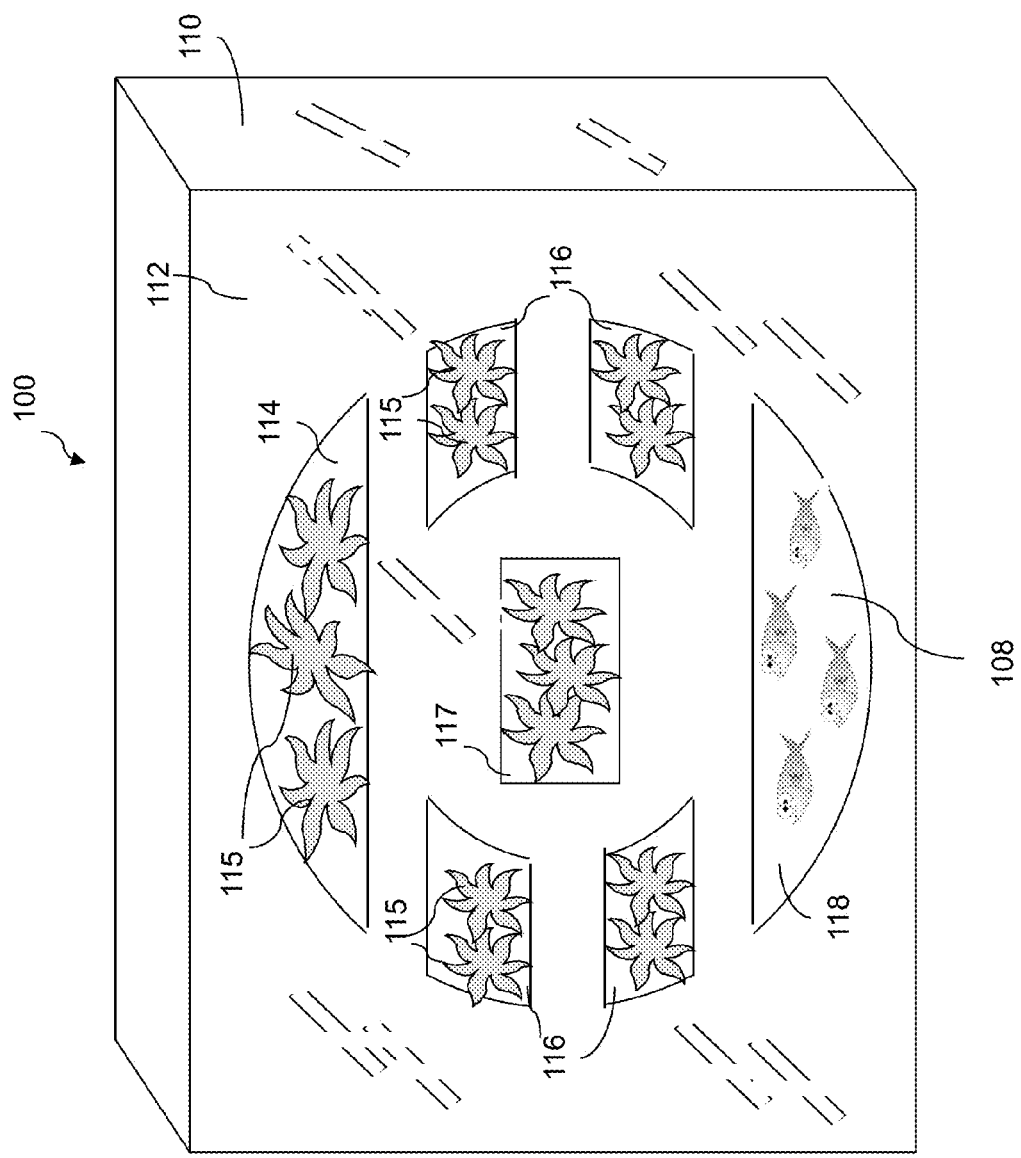
FIG. 1 is a front perspective view of first embodiment of the aquaponics system according to the present invention.
Figure 2:
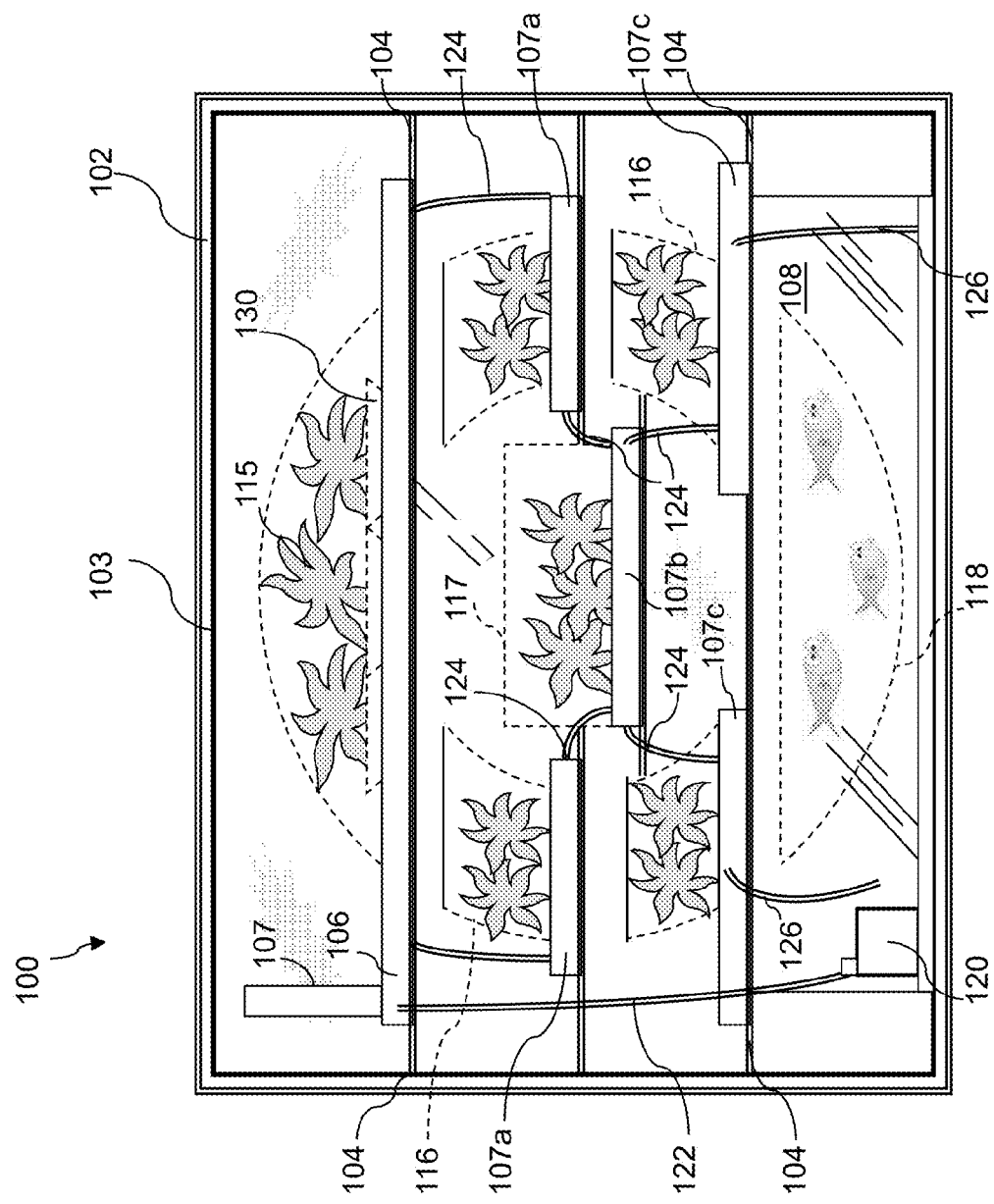
FIG. 2 is a diagrammatic rear view of the embodiment of FIG. 1.
Figure 3:
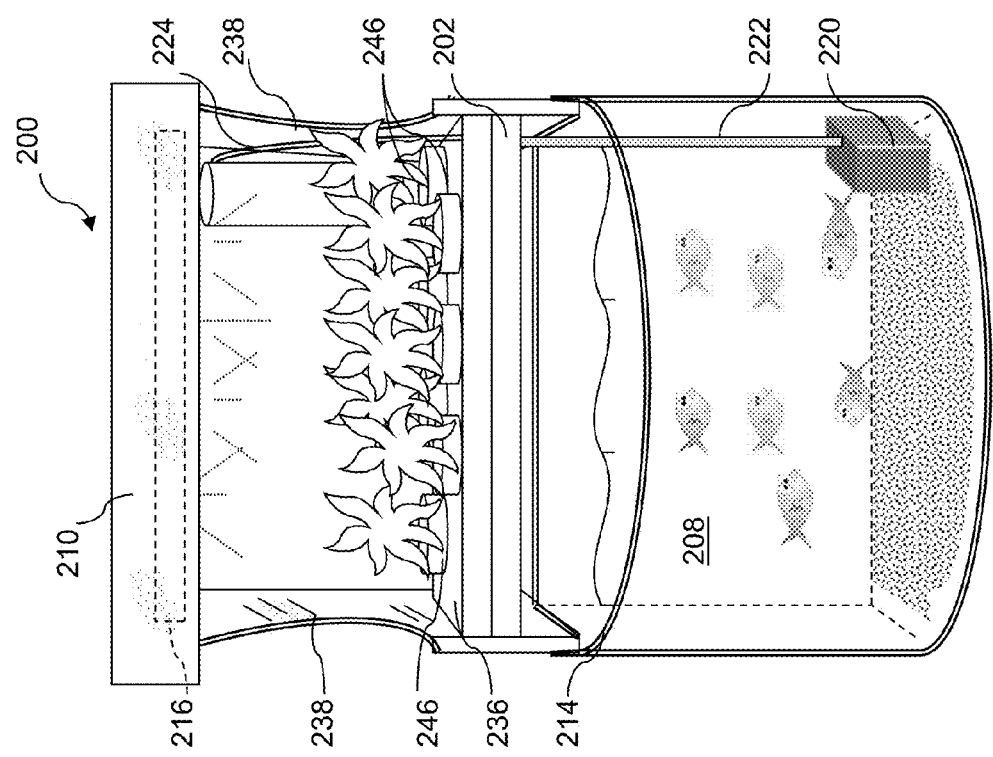
FIG. 3 is a front perspective view of a second embodiment of the aquaponics systems of the present invention.
Figure 5:
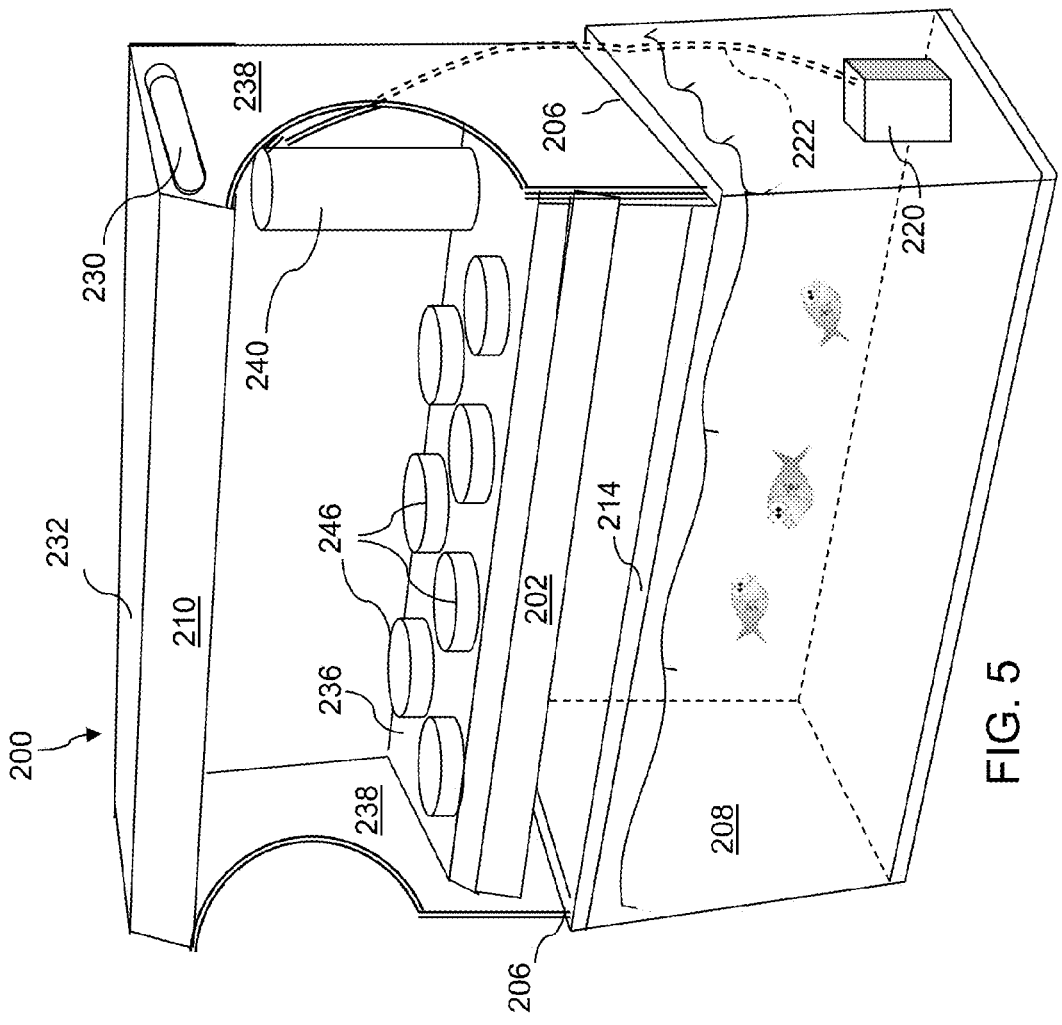
FIG. 5 is a front perspective view of the second embodiment.
Figure 4:
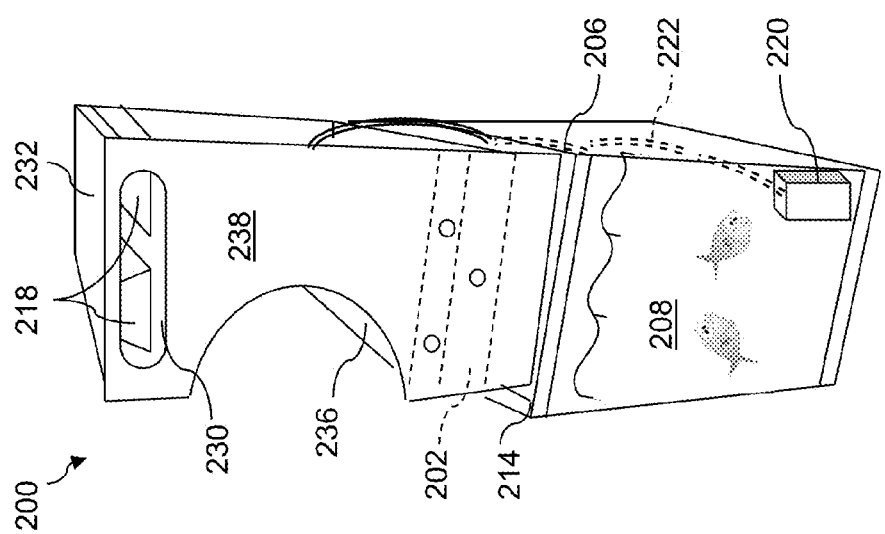
FIG. 4 is a side perspective view of the second embodiment.
Figure 6:
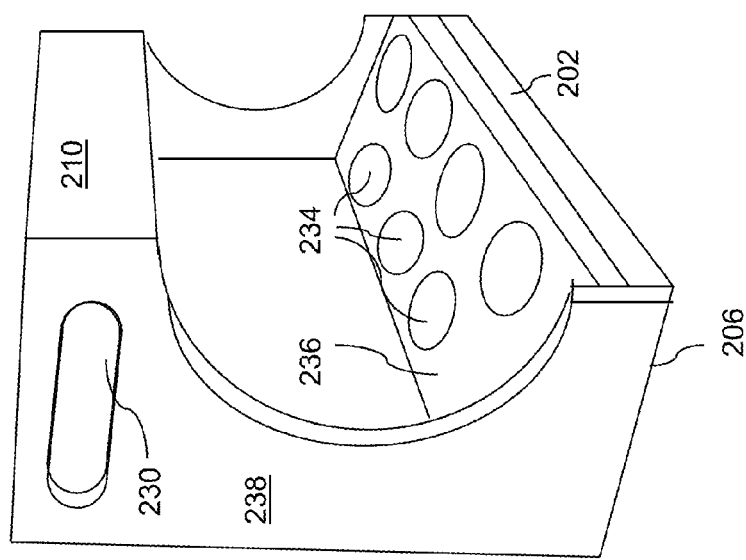
FIG. 6 is a side perspective view of the second embodiment.

FIGS. 1 and 2 illustrate a first embodiment of the inventive aquaponics assembly 100, which includes frame 102 with a plurality of horizontal supports 104, which are configured to support upper tray 106, lower mid-level trays 107a, 107b and 107c. Each of the trays is a water-containing structure for supporting a plurality of media containers 130 within which plants 115 may be grown. As illustrated, an aquarium 108 for housing aquatic fauna (e.g., fish or crayfish) is disposed in the lower portion of the assembly 100, however, in some embodiments, multiple aquaria may be placed at different locations within the assembly providing the frame 102 and horizontal supports 104 are structurally sufficient for supporting the weight of the aquarium and water. An outer skin 110 formed from sheet metal, wood or plastic paneling, stretched fabric, or other sheet-like material may be attached to the frame 102 to define a top, sides and front. When the aquaponics assembly 100 is installed in or near a residence or business such as a retail store, restaurant or other locale in which customers or visitors will be able to see the structure, the outer skin 110 may be selected to coordinate or augment the decor or to otherwise create an aesthetically pleasing structure. In the illustrated example, attractively-formed windows 114, 116, 117 and 118 may be formed in the front face 112 to allow the plants in the trays 106, 107a, 107b and 107c, and animals in the aquarium 108 to be seen. The windows may be completely open, or may be filled with a transparent material (glass, acrylic, polycarbonate, or the like) to allow the contents to be seen but not touched.

Different aquaponics techniques are known, including raft and ebb-and-flow systems. In the preferred embodiment, a pump 120 and an ebb-and-flow technique are used to feed the nutrient-rich water from the aquarium 108 through tubing 122 to the growing media in upper tray 106. The growing media provides a structure for plant roots as well as surface area for the proliferation of aerobic nitrifying bacteria. While a timer may be used to control the pump 120, in the exemplary embodiment, and automatic siphon, in this case, a bell siphon, is used. Bell siphons and their construction are well known in the art, so the details are not provided here. As the tray 106 fills, the siphon drains the water to lower trays 107a, 107b and 107c. Each tray may also be equipped with its own bell siphon (not shown), or a gravity feed may be used. Water draining from lower trays 107c is directed back into aquarium 108 to be cycled back through the system.

A grow light 103 may be suspended from the top portion of frame 102. In addition, while not shown, grow lights may be mounted on the bottom of each horizontal support 104 to provide the light required for the plants 115 to grow properly. Appropriate lighting may also be provided on the lowest horizontal support 104 for lighting the aquarium.

The aquaponics system 100 may have dimensions appropriate for placement on a tabletop, or may be larger, ranging from about 2 meters on up in a free-standing structure that can be used to define a wall or room divider. The aquaponics systems 100 may be installed in restaurants or food stores to provide a decorative structure from which fresh herbs and vegetables may be selected for purchase or immediate use. In a sufficiently large set-up, edible fish such as tilapia, trout, or perch, may be selected by restaurant patrons, or other aquatic fauna, may be available, including fresh water prawns, mussels and crayfish.

A second embodiment of the aquaponics system is illustrated in FIGS. 3-7. This assembly 200 may be used to retrofit aquariums that are commonly sold in pet supply stores to provide an educational and entertaining way to keep fish or other aquatic animals and grow decorative plants or herbs in a compact structure. Assembly 200 is a frame structure consisting of side panels 238, a hood face 210 and top 232, which support a tray 202 adapted for retaining water. The lower edges 206 of side panels 238 are configured to sit stably on top of the aquarium upper rim 214. In the preferred embodiment, assembly 200 is formed by molding and/or machining a plastic or polymer such as polypropylene or similar material, making it lightweight and easy to clean, as well as being inexpensive to manufacture. Side panels 238 are shown with a curved cutout at the front of the assembly. This cutout facilitates access to the plants as well as creating an attractive structure. Different designs may be used to enhance both the aesthetics and functionality of the assembly. Stability may be enhanced by including channels that fit over the upper rim 214, or clamps or other fastening means may be used to removably secure the frame on top of the aquarium. Supported within the upper portion of assembly 200 is one or more light fixtures 218 within which grow lamps or other appropriate lighting may be placed. Openings 230 may be formed through side panes 238 to allow easy access to the fixture's switches, and also provide means for easily handling the assembly for placement onto or removal from the aquarium.

Tray upper surface 236 has a plurality of openings 234 formed therein for receiving containers 246 for retaining growing media within which plants 212 may be grown. As described above with reference to the first embodiment, an ebb-and-flow technique may be used, with water being pumped from the aquarium 208 by pump 220 through tubing 222 into tray 202. Bell siphon 240 prevents the tray from overflowing and feeds the cleaned water back into the aquarium through tube 226.

Figure 7:
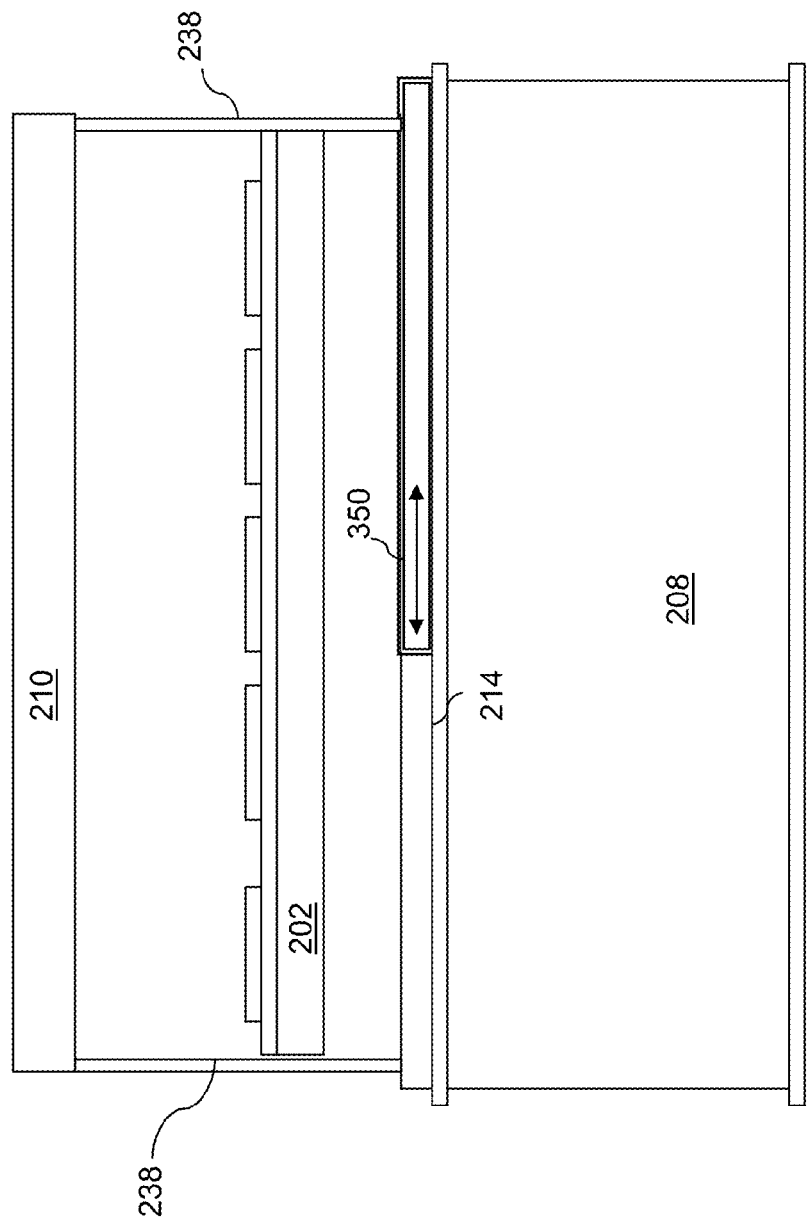
FIG. 7 is an alternative embodiment of the invention.

FIG. 7 illustrates a configuration of the second embodiment which includes an adjustable support frame 350 that may be extended along its lateral dimension to adapt the assembly for different length aquariums. In one variation, the frame 350 may include additional adjustability along the transverse dimension to fit different width aquariums.

The assembly 200 provides an ideal classroom tool for teaching children the principles of aquaponics and the science of the nitrogen cycle while allowing them to keep a classroom "pet", such as ornamental fish or a crayfish, in a healthy condition.

Additional features of the invention will be readily apparent from the foregoing description and the accompanying figures. Accordingly, the invention is not intended to be limited solely to the exemplary embodiments described above.

The invention claimed is:

1. An aquaponics assembly, comprising:
an aquarium having an upper rim having rim dimensions;
a frame having a lower frame portion with horizontal frame dimensions corresponding to the rim dimensions, the lower frame adapted to be removably mounted and fully supported on top of the upper rim of the aquarium, and an upper frame portion extending vertically from the lower frame portion;
a light fixture supported by the upper frame portion;
a horizontal tray disposed above the lower frame portion, the tray having an upper tray portion configured to support one or more plant containers and a lower tray portion disposed parallel to the upper tray portion and configured to retain and supply water to one or more plants supported by the upper tray portion;
a pump adapted for pumping water from the aquarium;
tubing having a first end connected to the pump and a second end connected to the tray for directing water from the aquarium to the tray; and
a drain disposed within the lower tray portion adapted to release water from the tray into the aquarium.

2. The aquaponics assembly of claim 1, wherein the drain further comprises a siphon.

3. The aquaponics assembly of claim 1, further comprising a timer for controlling operation of the pump.

4. The aquaponics assembly of claim 1, wherein the lower frame portion has adjustable dimensions.

5. The aquaponics assembly of claim 1, wherein the tray is integrally formed with the frame.

6. The aquaponics assembly of claim 2, wherein the siphon is a bell siphon.

7. A kit for converting an aquarium into an aquaponics system, the aquarium having an upper rim with rim dimensions, the kit comprising:
a lower frame portion having horizontal frame dimensions corresponding to the rim dimensions, the lower frame portion configured to be removably mounted and fully supported on the upper rim of the aquarium,
an upper frame portion extending vertically from the lower frame portion;
a light fixture supported by the upper frame portion;
a horizontal tray disposed above the lower frame portion, the tray having an upper tray portion configured to support one or more plants with roots extending downward from the upper tray portion and a lower tray portion disposed parallel to the upper tray portion and configured to retain and supply water to one or more plants supported by the upper tray portion;
a pump adapted for pumping water from the aquarium;
tubing having a first end connected to the pump and a second end connected to the tray for directing water from the aquarium to the tray; and
a drain disposed within the lower tray portion adapted to release water from the tray into the aquarium.

8. The kit of claim 7, wherein the drain further comprises a siphon.

9. The kit of claim 8, wherein the siphon is a bell siphon.

10. The kit of claim 7, further comprising a timer for controlling operation of the pump.

11. The kit of claim 7, wherein the lower frame portion has adjustable dimensions.

12. The kit of claim 7, wherein the tray is integrally formed with the lower frame portion.

13. The kit of claim 7, wherein the upper tray portion has a plurality of openings therethrough for receiving the one or more plant containers.

* * * * *